(12) United States Patent
Korzeniewski

(10) Patent No.: US 7,511,622 B2
(45) Date of Patent: Mar. 31, 2009

(54) USE OF OPTICAL MARK IN LABEL PRINTING AND LABEL DISPENSING

(75) Inventor: Eugene C. Korzeniewski, Gainesville, GA (US)

(73) Assignee: Avery Dennison Corporation, Pasadena, CA (US)

( * ) Notice: Subject to any disclaimer, the term of this patent is extended or adjusted under 35 U.S.C. 154(b) by 316 days.

(21) Appl. No.: 10/961,590

(22) Filed: Oct. 8, 2004

(65) Prior Publication Data

US 2006/0071796 A1    Apr. 6, 2006

Related U.S. Application Data

(60) Provisional application No. 60/613,584, filed on Sep. 27, 2004.

(51) Int. Cl.
  *G08B 13/14*    (2006.01)
  *B29C 65/00*    (2006.01)
  *E06B 9/26*     (2006.01)
  *A41H 37/00*    (2006.01)

(52) U.S. Cl. ............ 340/572.8; 340/572.1; 340/572.4; 156/64; 156/65; 156/66

(58) Field of Classification Search ................ None
See application file for complete search history.

(56) References Cited

U.S. PATENT DOCUMENTS

| | | |
|---|---|---|
| 4,585,506 A | 4/1986 | Matsuguchi |
| 5,745,988 A | 5/1998 | Hohmann et al. |
| 5,785,798 A | 7/1998 | Horsman et al. |
| 5,978,004 A | 11/1999 | Ehrhardt |
| 6,237,217 B1 | 5/2001 | Bohn et al. |
| 6,471,802 B1 | 10/2002 | Williamson |
| 6,550,512 B2 | 4/2003 | Yang |
| 6,575,216 B2 | 6/2003 | Yang |
| 6,588,476 B1 | 7/2003 | Bohn et al. |
| 6,593,853 B1 * | 7/2003 | Barrett et al. ............ 340/572.1 |
| 7,176,799 B1 * | 2/2007 | Golicz et al. ............ 340/572.1 |
| 7,180,419 B2 * | 2/2007 | Oakes et al. ............ 340/572.1 |
| 2005/0223286 A1 | 10/2005 | Forster |
| 2006/0071063 A1 * | 4/2006 | Duckett ..................... 235/375 |
| 2006/0082446 A1 * | 4/2006 | Dods ...................... 340/10.51 |
| 2006/0182920 A1 * | 8/2006 | Craig ........................ 428/40.1 |

OTHER PUBLICATIONS

Patent Abstracts of Japan, vol. 1996, No. 02, Feb. 29, 1996 (corresponding to JP 07 261666A, published Oct. 13, 1995).

* cited by examiner

*Primary Examiner*—Julie Lieu
(74) *Attorney, Agent, or Firm*—Kriegsman & Kriegsman

(57) ABSTRACT

An RFID label assembly and method of manufacturing the same. In one embodiment, the manufacturing method comprises the steps of (a) providing an RFID label assembly, the RFID label assembly comprising a common web, the common web having a top surface and a bottom surface, a plurality of RFID labels spaced apart from one another and releasably mounted on top of the common web, at least some of the RFID labels being defective and at least some of the RFID labels not being defective, and an eye mark printed on the bottom surface of the common web for each of the RFID labels, each eye mark having a length corresponding to the length of its corresponding RFID label; (b) testing each of the RFID labels for the purpose of detecting defective RFID labels; and (c) removing from the common web all RFID labels found in step (b) to be defective.

20 Claims, 17 Drawing Sheets

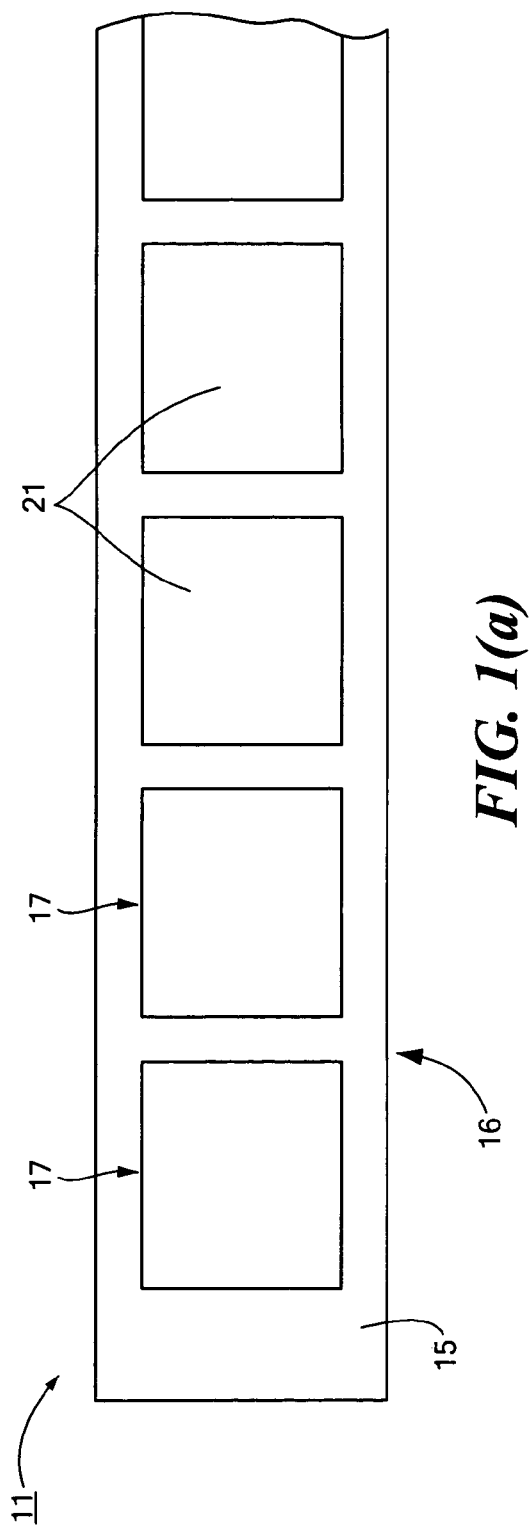
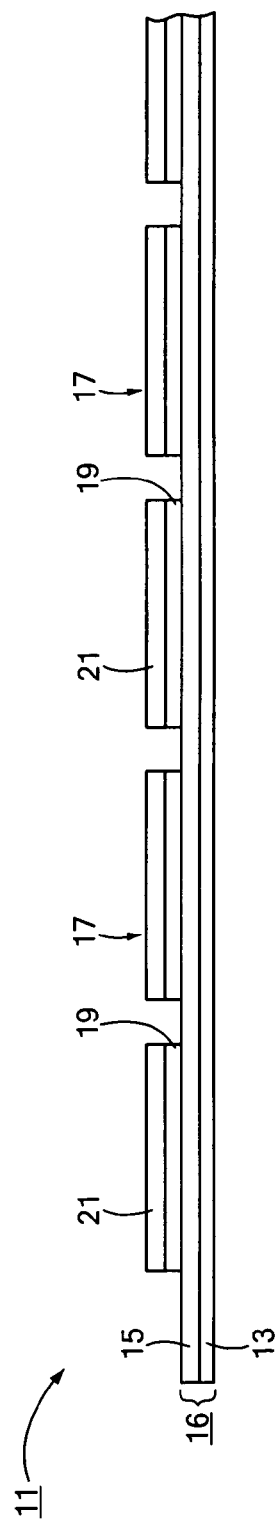
FIG. 1(a)
FIG. 1(b)

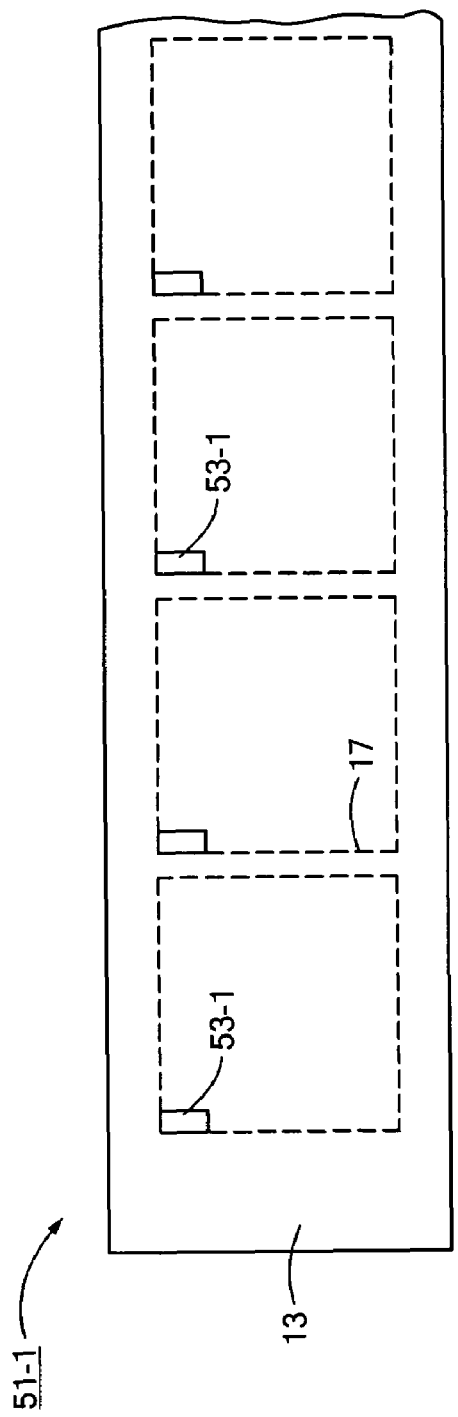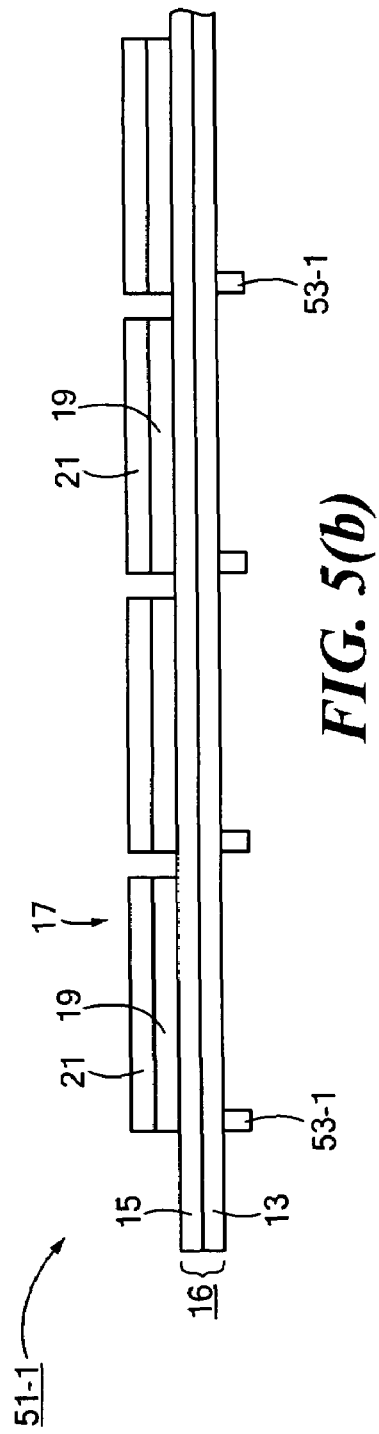
FIG. 5(a)
FIG. 5(b)

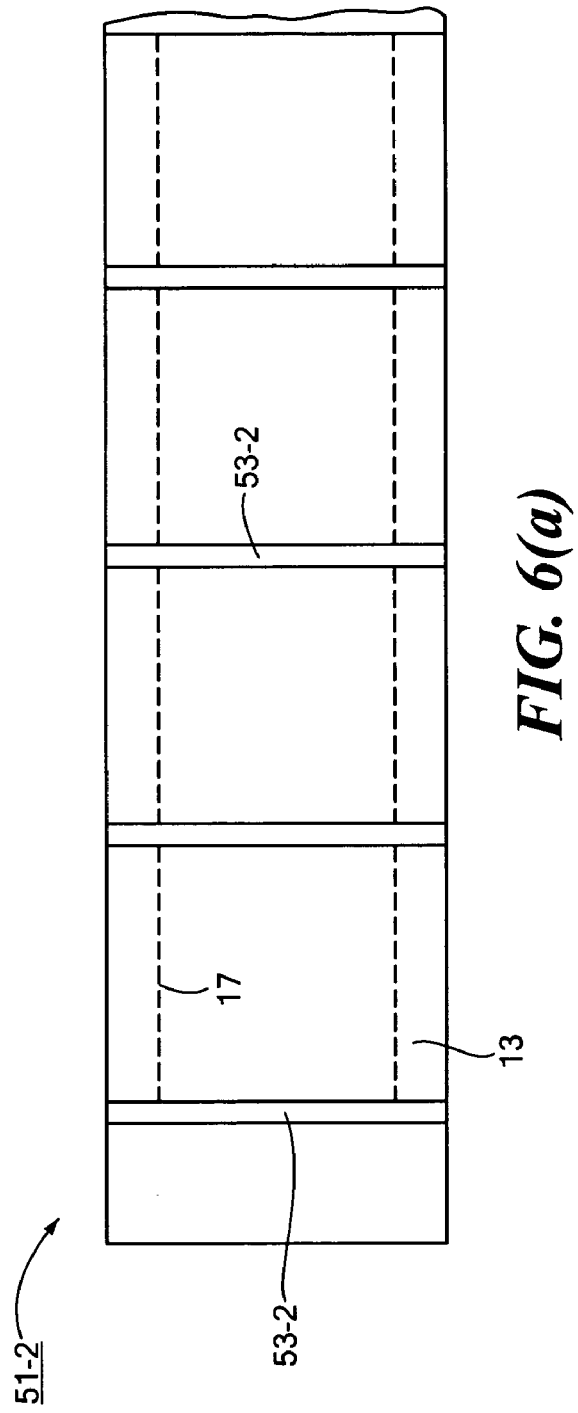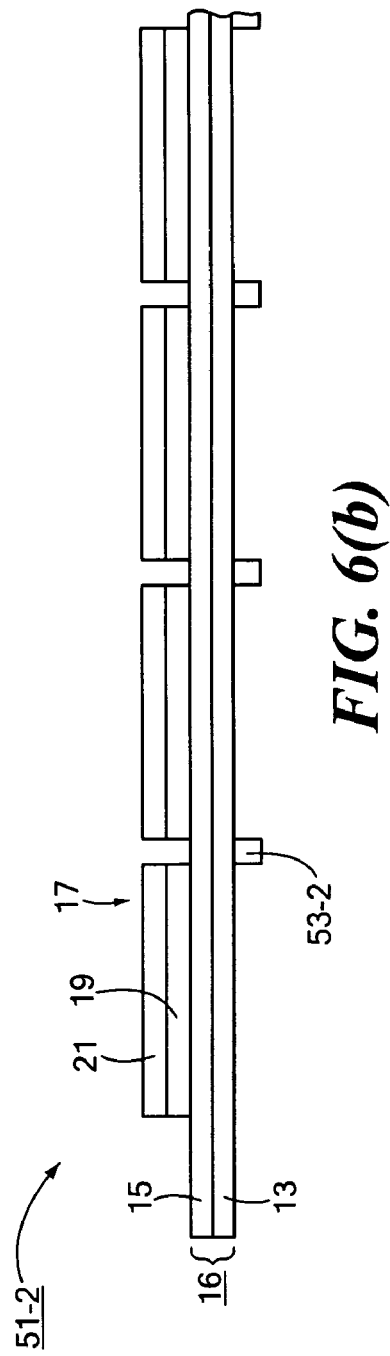

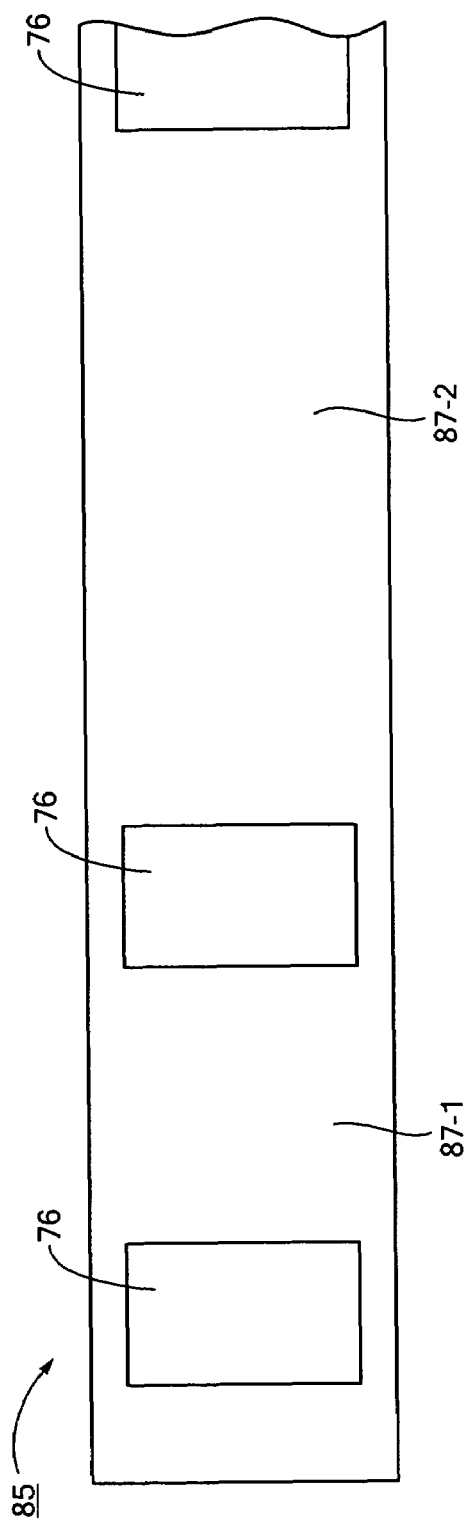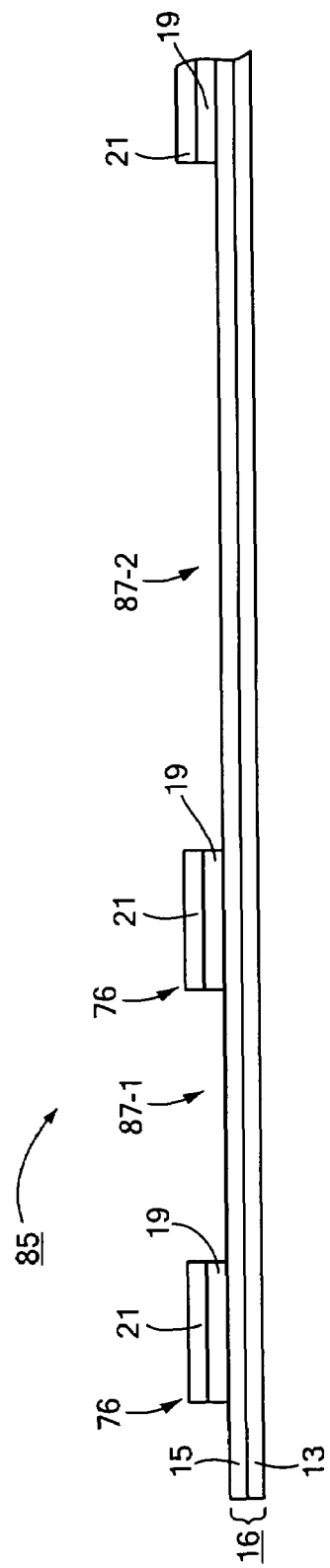
FIG. 9(a)
FIG. 9(b)

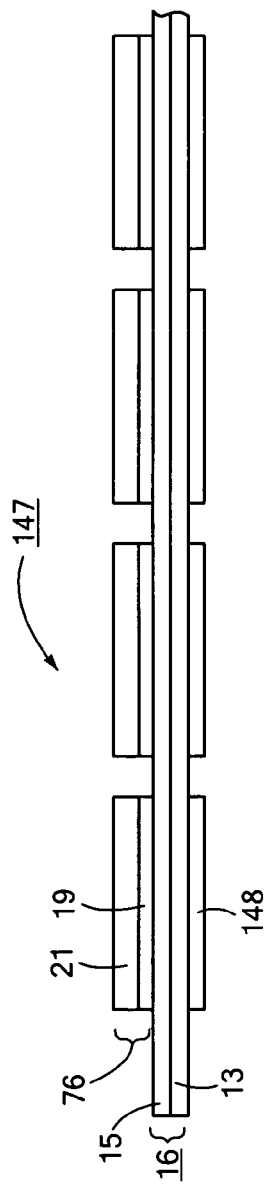
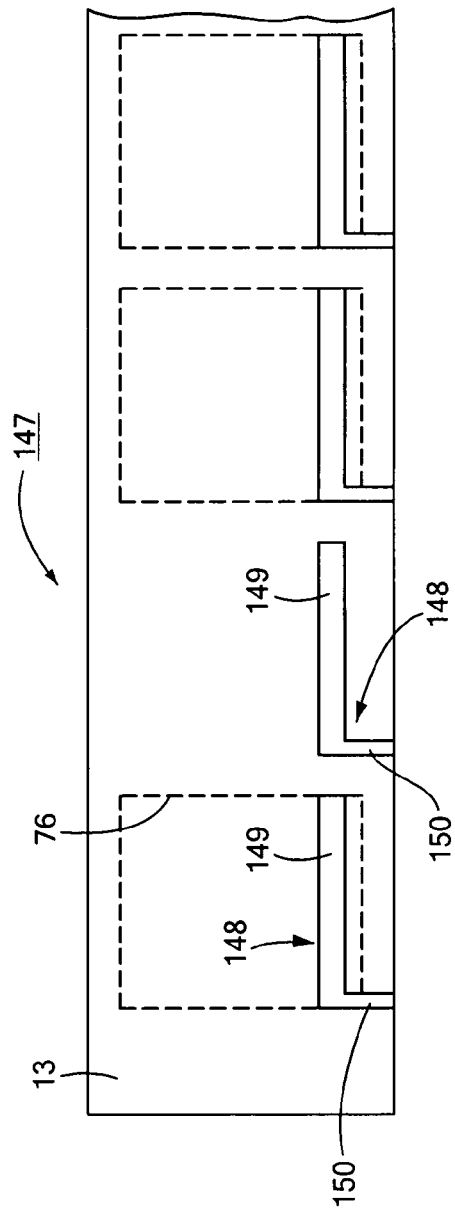

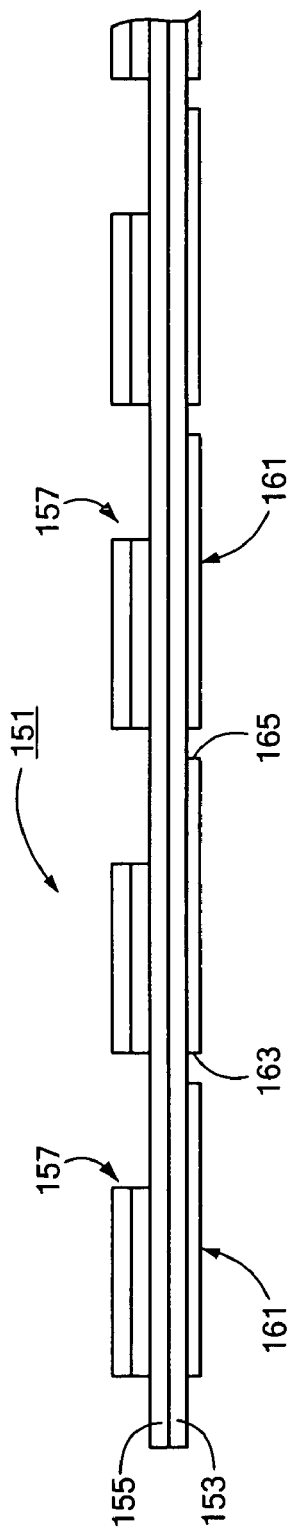
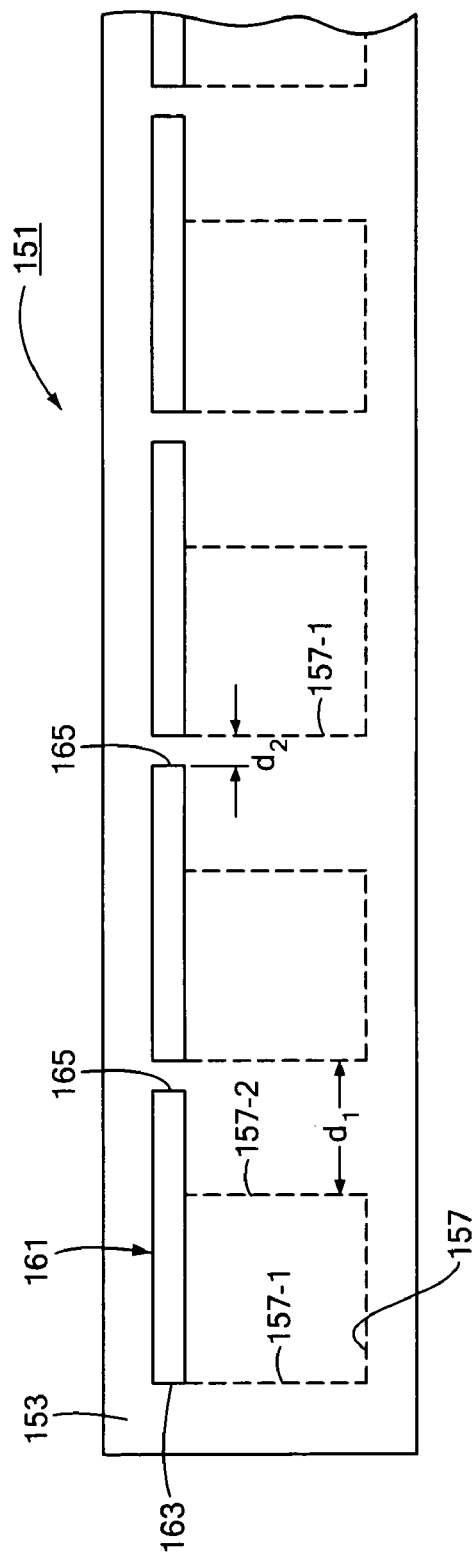
FIG. 15(a)
FIG. 15(b)

USE OF OPTICAL MARK IN LABEL PRINTING AND LABEL DISPENSING

CROSS-REFERENCE TO RELATED APPLICATIONS

The present application claims the benefit under 35 U.S.C. 119(e) of U.S. Provisional Patent Application No. 60/613,584, filed Sep. 27, 2004, the disclosure of which is incorporated herein by reference.

BACKGROUND OF THE INVENTION

The present invention relates generally to label assemblies of the type comprising a plurality of labels releasably mounted on a common backing and relates more particularly to techniques for proper registration of individual labels of such assemblies in label printing and/or dispensing devices.

It is commonplace for articles of commerce to be labeled with one or more labels, many of which contain various items of information, such information including, but not being limited to, the trademark and/or generic name of the article, instructions for use and/or care of the article, article size information, article pricing information, a serial number uniquely identifying each article, authenticity information, and the like.

One type of label that is commonly used to label articles of commerce is an adhesive-backed label. Often, such a label is formed as part of a label assembly comprising a plurality of labels spaced apart from one another and releasably mounted on a common web of material. Referring now to FIGS. 1(a) and 1(b), there are shown top and side views, respectively, of a conventional label assembly 11 of the aforementioned type. As can be seen, label assembly 11 comprises a backing 13, a release coating 15 applied to the top surface of backing 13 (backing 13 and release coating 15 jointly defining a common web 16), and a plurality of labels 17 spaced apart on release coating 15. (Typically, labels 17 are spaced apart from one another by a distance of approximately ⅛ to ¼ inch.) Label assembly 11 is typically wound into a roll and then unwound as needed. (Alternatively, instead of being wound into a roll, label assembly 11 may be stored in a fanfold, which may be unfolded as needed.)

Backing 13 is typically a length of polyethylene terephthalate film, a length of Mylar® polyester film, or a strip of paper. Release coating 15 is typically a silicone or wax release. Each of labels 17 typically includes an adhesive layer 19 and a face sheet 21. Adhesive layer 19, which comprises a pressure-sensitive adhesive, is in direct contact with release coating 15. Face sheet 21, which is positioned directly over adhesive layer 19, is typically made of a print-receptive material, such as paper.

Although the particular information appearing on face sheet 21 may be printed by the label manufacturer, with the resultant pre-printed labels then being shipped to an industrial user of the label for application of the label to an article, it has become increasingly more common for some or all of such printed information to be printed by the industrial user of the label on an "as needed" or "on demand" basis.

In any event, whether the printing is done by the label manufacturer or by the industrial user, such printing is typically performed using an automated printing system in which the label assembly is progressively unwound from a roll (or unfolded from a fanfold) and individual labels are successively advanced to a printer head at a printing station, where the printer head prints the desired information onto each label, and the label assembly is then re-wound (or re-folded) after the printing station or dispensed. The latter is for manual or automatic application of the label to the article.

As can be appreciated, it is very important that the individual labels be registered properly with the printer head so that the information printed from the printer head is properly aligned with each label. Consequently, most printers include some type of registration sensor for sensing the leading edge of each label (also referred to as "the top of form") in order to synchronize printing with the desired positioning of the label. One of the most common types of registration sensors present in label printing systems is an optical transmission sensor. Referring now to FIG. 2, such a sensor 31 typically comprises a light source 33 and a light detector 35, light source 33 and light detector 35 being positioned above and below, respectively, (or below and above, respectively) label assembly 11. As can be seen, light source 33 is positioned to illuminate label assembly 11, and light detector 35 is positioned to detect the light transmitted through assembly 11. Sensor 31 makes use of the fact that the amount of light passing through label assembly 11 is greater in the areas between labels 17 than in the areas in which labels 17 are present. (To make even more conspicuous the difference in light transmission between the areas between labels 17 and the areas in which labels 17 are present, one could provide holes in web 16 in the areas between labels 17.) Another registration sensor of the type present in label printing systems is an optical reflection sensor. As seen in FIG. 3, such a sensor 41 typically comprises a light source 43 positioned below a label assembly 51 for illuminating the bottom of label assembly 51 and a light detector 45 positioned below label assembly 51 for detecting the light reflected off the bottom of label assembly 51. In order for optical reflection sensor 41 to detect the leading edge of a label 17, a dark or opaque registration or eye mark 53 is printed on the bottom of backing 13 along the leading edge of each label 17. Bottom and side views of a portion of label assembly 51 are shown in FIGS. 4(a) and 4(b), respectively. As can be seen, eye mark 53 is printed on the bottom of backing 13 across the entire width of backing 13 at the leading edge of each label 17. Typically, eye mark 53 has a width w of about one-quarter to three-eighths of an inch, viewed along the longitudinal axis of label assembly 51. Alternative label assemblies 51-1 through 51-3 having differently positioned eye marks 53-1 through 53-3, respectively, are shown in FIGS. 5(a) and 5(b), FIGS. 6(a) and 6(b), and FIGS. 7(a) and 7(b), respectively, eye marks 53-2 and 53-3 being aligned with the "matrix strip" between adjacent labels 17, as opposed to being aligned with labels 17, themselves. One advantage of eye marks that extend across the entire width of the web, as is the case with marks 53 and 53-2, is compatibility with a wide range of printers having different sensor cross-web locations.

Still another, but even less common, registration sensor is a capacitive sensor, which makes use of differences in the dielectric characteristics of the label assembly in the areas between labels and the areas within labels in order to identify the leading edge of each label.

Registration sensors of the type described above not only are used to synchronize printing with the arrival of a label at a printer head but also are used by many printers to determine when the printer is out of labels. (In some cases, a separate but similar sensor is used for sensing when the printer is out of labels.) More specifically, if the registration sensor does not sense the leading edge of a label within a certain interval defined as the next label position or, in some cases, within the next two or three label positions from a previously sensed label, many printers are designed to determine that the last label of the label assembly has been fed, causing the printer to shut down automatically to permit the re-loading of labels into the printer.

Of course, for a label to serve its purpose, such a label must eventually be applied to its intended article. Although the application of labels to articles may be done manually, it has become increasingly more common for such applications to be done with automated equipment. Examples of various types of label applicators are disclosed in the following patents, all of which are incorporated herein by reference: U.S. Pat. No. 6,575,216, inventor Yang, issued Jun. 10, 2003; U.S. Pat. No. 6,550,512, inventor Yang, issued Apr. 22, 2003; U.S. Pat. No. 6,471,802, inventor Williamson, issued Oct. 29, 2002; U.S. Pat. No. 5,785,798, inventor Horsman et al., issued Jul. 28, 1998; and U.S. Pat. No. 4,585,506, inventor Matsuguchi, issued Apr. 29, 1986.

Typically, a label applicator system comprises means for conveying the articles being labeled, means for conveying the label assembly and an applicator plate for use in transferring the labels from the common web of the label assembly to the articles to be labeled. As can readily be appreciated, a label applicator also typically includes registration means for use in synchronizing label transfer from the common web to the articles being labeled and for use in determining when the applicator should automatically shut down once the supply of labels has been exhausted. In most cases, such registration means takes the form of an appropriately positioned optical transmission sensor of the type described above; less often, such registration means takes the form of an appropriately positioned optical reflection sensor of the type described above. As can be appreciated, if the sensor is an optical reflection sensor, the label assembly used therewith must include eye marks.

It should be noted that, although label printing and label dispensing have been described above as being performed by two different types of devices, there do exist combination printer/applicators that sequentially perform the label printing and label dispensing functions.

One type of label that has grown in popularity over the last several years is an RFID (radio frequency identification) label. Referring now to FIGS. 8(a) and 8(b), there are shown fragmentary section and fragmentary, partially exploded views, respectively, of a conventional label assembly of the type comprising a plurality of RFID labels, said label assembly being represented generally by reference number 71. Assembly 71 is similar in most respects to assembly 11, the principal difference between assembly 71 and assembly 11 being that, in assembly 71, in addition to conventional label materials, the label 76 incorporates an RFID inlay 75. As seen in FIG. 8(b), inlay 75, which is sandwiched between face sheet 21 and adhesive layer 19, comprises a carrier sheet 77, the top surface of which is positioned against the bottom surface of face sheet 21, an antenna 79 adhered to the bottom surface of carrier sheet 77, and an IC chip 81 bonded to the bottom surface of antenna 79.

RFID label assemblies of the type described above may be used in printing and/or dispensing devices of the type described above. Typically, such printing and/or dispensing devices are additionally equipped with an RFID tester/programmer that may be used to determine whether the inlay is defective. If the inlay is not found to be defective, the RFID tester/programmer may also be used to program the inlay with information. In the case of a printer, if a label is tested and found to have a defective inlay, the printer head will typically print a marking on the face sheet 21 to indicate to an operator that the label is unusable and should not be dispensed from an applicator. In the case of an applicator, if a label is tested and found to have a defective inlay, the applicator will typically transfer the unusable label onto a dummy article or will keep the unusable label on the web and advance the label assembly to test the next label.

If the percentage of labels having defective inlays were minuscule, the above-described procedure for dealing with defective labels would be adequate. Unfortunately, however, the percentage of labels having defective inlays is currently about 1-20%. Consequently, much time is presently spent by printing and/or dispensing devices in testing labels for defective inlays (some devices testing each label a number of times before concluding that the label has a defective inlay). In addition, because some applicators are designed not to dispense defective labels onto a dummy article, but rather, to keep the defective labels on the web, the presence of a large number of non-dispensed, defective labels on a web may make difficult the re-winding of the web. Furthermore, from the perspective of a label manufacturer, it would be desirable to provide the industrial user of the label with as few defective labels as possible.

Independent of the problems noted above with RFID label assemblies, another common problem involving RFID label assemblies concerns the testing of the inlays of such labels for the purpose of identifying defective inlays. As can readily be appreciated, in order to properly identify defective inlays, one must be able to test one inlay at a time. Unfortunately, however, RFID labels are frequently spaced so closely to one another on a common web (typically about ⅛ to ¼ inch apart) that a reader antenna will elicit readings from not only the inlay of interest but also one or more of its neighboring inlays (such an undesired simultaneous reading of two or more inlays called "a collision"). One approach to this problem would be to space the RFID labels sufficiently apart on the web so that only the inlay of interest will produce a signal. However, as can be seen from the discussion above, if the RFID labels are spaced apart by a significant distance, many printing and/or dispensing devices will mistakenly determine that they are out of labels and will automatically shut down.

SUMMARY OF THE INVENTION

According to one aspect of the invention, there is provided a method of manufacturing an RFID label assembly, said method comprising the steps of (a) providing an RFID label assembly, said RFID label assembly comprising a plurality of RFID labels spaced apart from one another and releasably mounted on top of a common web, said common web having a top surface and a bottom surface, at least some of said RFID labels being defective and at least some of said RFID labels not being defective; (b) testing each of said RFID labels for the purpose of detecting defective RFID labels; and (c) removing from said common web all RFID labels found in step (b) to be defective.

In a preferred embodiment, the foregoing manufacturing method comprises the steps of (a) providing an RFID label assembly, the RFID label assembly comprising a common web, the common web having a top surface and a bottom surface, a plurality of RFID labels spaced apart from one another and releasably mounted on top of the common web, at least some of the RFID labels being defective and at least some of the RFID labels not being defective, and an eye mark printed on the bottom surface of the common web for each of the RFID labels, each eye mark having a length corresponding to the length of its corresponding RFID label; (b) testing each of the RFID labels for the purpose of detecting defective RFID labels; and (c) removing from the common web all RFID labels found in step (b) to be defective.

According to another aspect of the invention, there is provided a label assembly comprising (a) an elongated web, said elongated web having a top surface and a bottom surface; (b) a plurality of labels, said plurality of labels being spaced apart from one another and releasably mounted on said top surface of said elongated web, each of said labels having a leading edge and a trailing edge; and (c) an eye mark printed on said bottom surface of said elongated web for each of said labels, said eye mark extending at least from a first location aligned with said leading edge of a corresponding label to a second location aligned with said trailing edge of said corresponding label.

Preferably, the labels of the aforementioned label assembly are RFID labels, each of said RFID labels preferably including a pressure-sensitive adhesive layer releasably mounted on said elongated web, a face sheet mounted over said pressure-sensitive adhesive layer, and an RFID inlay sandwiched between the print-receptive face sheet and the elongated web.

The present invention is also directed to label assemblies made by the above methods.

According to yet another aspect of the invention, there is provided a method of processing labels, said method comprising the steps of (a) providing an RFID label assembly, said RFID label assembly comprising a plurality of RFID labels spaced apart and releasably mounted on a common label web and comprising eye marks printed on the bottom of the common label web in correspondence with the length of each label position, some of the label positions being unoccupied by labels; (b) providing a label printing and/or dispensing device, said label printing and/or dispensing device having an optical transmission sensor for sensing RFID labels; and (c) using said label printing and/or dispensing device to print and/or dispense the RFID labels of said RFID label assembly; (d) wherein said eye marks of said RFID label assembly are appropriately positioned on said common label web so as to be read by said optical transmission sensor as indicating that missing labels are present.

According to still another aspect of the invention, there is provided a method of processing labels, said method comprising the steps of (a) providing an RFID label assembly, said RFID label assembly comprising a plurality of RFID labels spaced apart and releasably mounted on a common label web and comprising eye marks printed on the bottom of the common label web in correspondence with the length of each label position, some of the label positions being unoccupied by labels; (b) providing a label printing and/or dispensing device, said label printing and/or dispensing device having an optical transmission sensor for sensing RFID labels and an optical reflection sensor for sensing RFID labels, said optical transmission sensor and said optical reflection sensor being used at the same time; and (c) using said label printing and/or dispensing device to print and/or dispense the RFID labels of said RFID label assembly; (d) wherein said eye marks of said RFID label assembly are appropriately positioned on said common label web so as to be read by said optical reflection sensor but not by said optical transmission sensor.

According to still yet another aspect of the invention, there is provided a label sensing system for use in a label printing and/or dispensing device, said label sensing system adapted for use with an RFID label assembly, said RFID label assembly comprising a plurality of RFID labels spaced apart and releasably mounted on a common label web and comprising eye marks printed on the bottom of the common label web in correspondence with the length of each label position, some of the label positions being unoccupied by labels, said label sensing system comprising (a) optical reflection sensing means for determining the presence of an eye mark on said label assembly at a potential label position; (b) optical transmission sensing means for determining the presence of a label on said label assembly at said potential label position; and (c) means, coupled to said optical reflection sensing means and said optical transmission sensing means, for determining whether a label has previously been removed from said label assembly at said potential label position.

According to a further aspect of the invention, there is provided a label assembly, said label assembly comprising (a) an elongated web, said elongated web having a top surface and a bottom surface; (b) a plurality of RFID labels, said plurality of RFID labels being releasably mounted on said top surface of said elongated web and spaced apart from one another sufficiently to avoid collisions between RFID inlays of different RFID labels, each of said RFID labels having a leading edge and a trailing edge; and (c) an eye mark printed on said bottom surface of said elongated web for each of said RFID labels, said eye mark having a leading edge and a trailing edge, one of said leading edge and said trailing edge of said eye mark being aligned with said leading edge and said trailing edge, respectively, of a corresponding RFID label, the other of said leading edge and said trailing edge of said eye mark extending to within $1/8$ to $1/4$ inch of an adjacent eye mark.

According to still a further aspect of the invention, there is provided a label assembly, said label assembly comprising (a) an elongated web, said elongated web having a top surface and a bottom surface; (b) a plurality of RFID labels, said plurality of RFID labels being releasably mounted on said top surface of said elongated web and spaced apart from one another sufficiently to avoid collisions between RFID inlays of different RFID labels, each of said RFID labels having a leading edge and a trailing edge; and (c) an eye mark printed on said bottom surface of said elongated web for each of said RFID labels, said eye mark having a leading edge and a trailing edge, one of said leading edge and said trailing edge of said eye mark being aligned with a portion of a corresponding RFID label, the other of said leading edge and said trailing edge of said eye mark extending to within $1/8$ to $1/4$ inch of an adjacent RFID label.

For purposes of the present specification and claims, various relational terms like "top," "bottom," "over," and "under," are used to describe the present invention when said invention is positioned in or viewed from a given orientation. It is to be understood that, by altering the orientation of the invention, certain relational terms may need to be adjusted accordingly.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts:

FIGS. 1(a) and 1(b) are fragmentary top and fragmentary side views, respectively, of a conventional label assembly of the type comprising a plurality of pressure-sensitive labels spaced apart from one another and releasably mounted on a common web of material;

FIGS. 5(a) and 5(b) are fragmentary bottom and fragmentary side views, respectively, of a first alternative conventional label assembly of the type including eye marks, with broken lines being used in FIG. 5(a) to denote the positioning of labels on the top surface of the release coating;

FIGS. 6(a) and 6(b) are fragmentary bottom and fragmentary side views, respectively, of a second alternative conventional label assembly of the type including eye marks, with broken lines being used in FIG. 6(a) to denote the positioning of labels on the top surface of the release coating;

FIGS. 9(a) and 9(b) are fragmentary top and fragmentary side views, respectively, of a first embodiment of a label assembly constructed according to the teachings of the present invention;

FIGS. 14(a) and 14(b) are fragmentary side and fragmentary bottom views, respectively, of a third embodiment of a label assembly constructed according to the teachings of the present invention (broken lines being used in FIG. 14(b) to denote the positioning of labels on the top surface of the release coating);

FIGS. 15(a) and 15(b) are fragmentary side and fragmentary bottom views, respectively, of a fourth embodiment of a label assembly constructed according to the teachings of the present invention (broken lines being used in FIG. 15(b) to denote the positioning of labels on the top surface of the release coating);

DETAILED DESCRIPTION OF PREFERRED EMBODIMENTS

Figure 2:
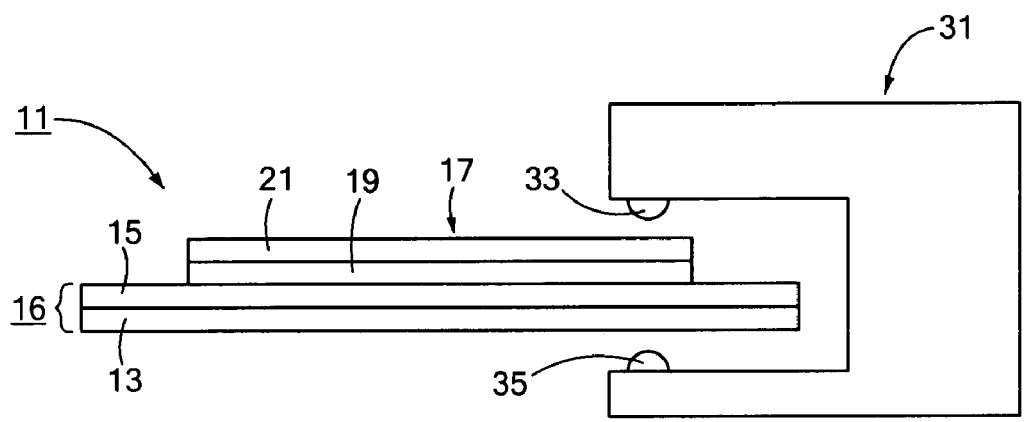
FIG. 2 is a schematic end view of a conventional optical transmission sensor of the type used in a label printing and/or dispensing device to detect the leading edge of a label, the optical transmission sensor being shown with a length of the conventional label assembly of FIGS. 1(a) and 1(b)
Figure 3:
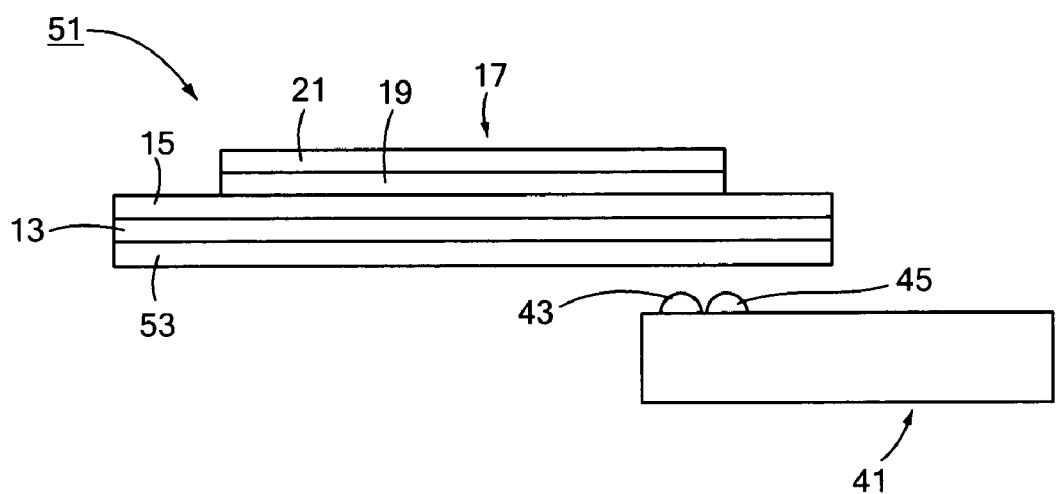
FIG. 3 is a schematic end view of a conventional optical reflection sensor of the type used in a label printing and/or dispensing device to detect the leading edge of a label, the optical reflection sensor being shown with a length of a conventional label assembly of the type including eye marks.
Figure 4A:
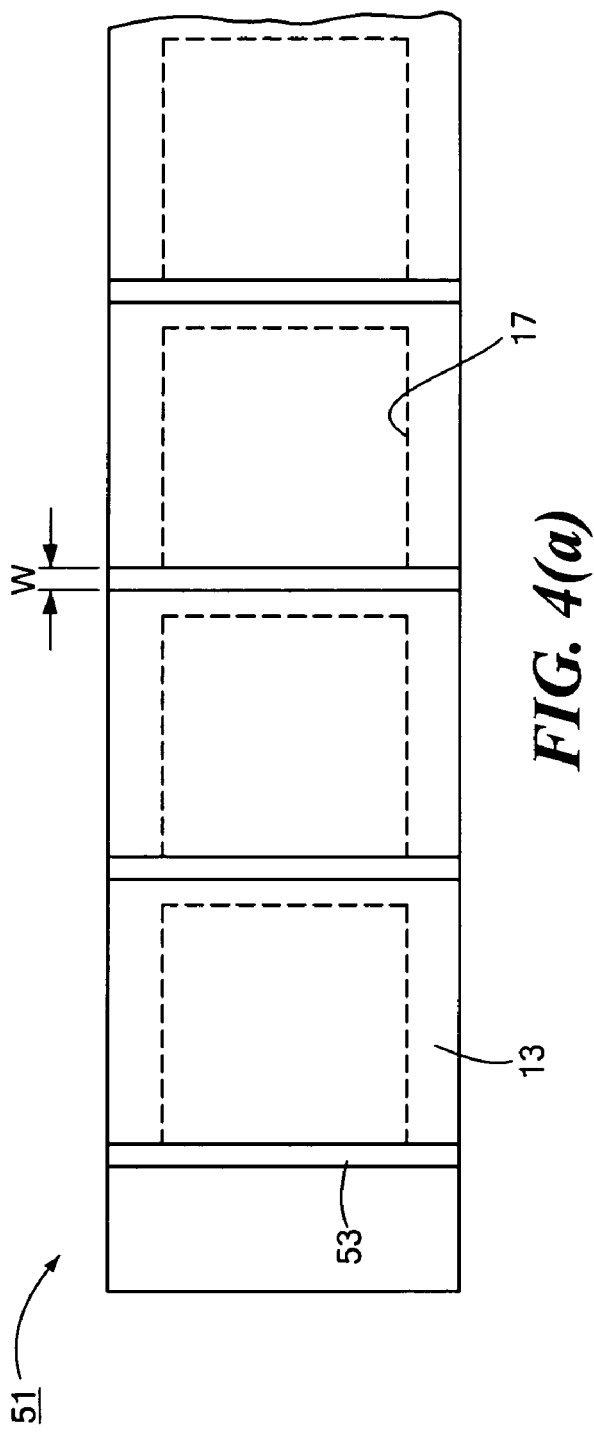
FIGS. 4(a) and 4(b) are fragmentary bottom and side views, respectively, of the conventional label assembly shown in FIG. 3, with broken lines being used in FIG. 4(a) to denote the positioning of labels on the top surface of the release coating.
Figure 4B:
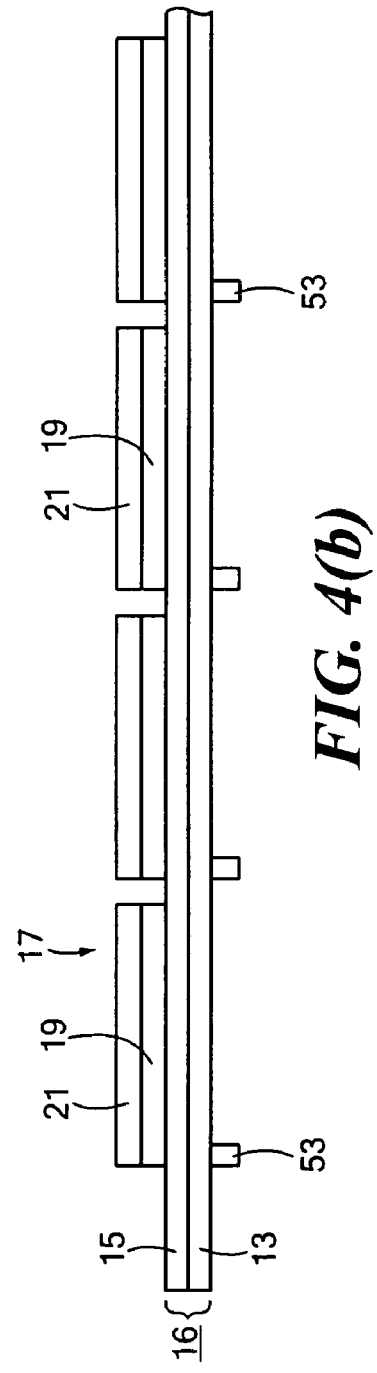
Figure 7A:
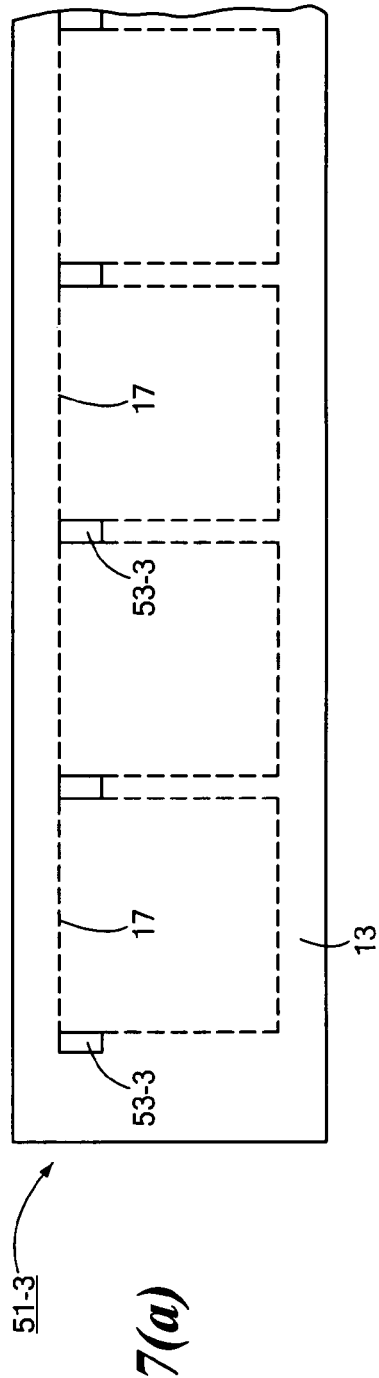
FIGS. 7(a) and 7(b) fragmentary bottom and fragmentary side views, respectively, of a third alternative conventional label assembly of the type including eye marks, with broken lines being used in FIG. 7(a) to denote the positioning of labels on the top surface of the release coating.
Figure 7B:
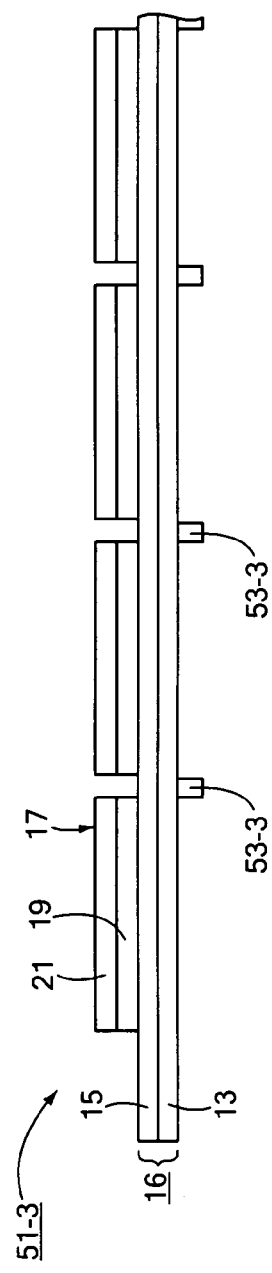
Figure 8A:
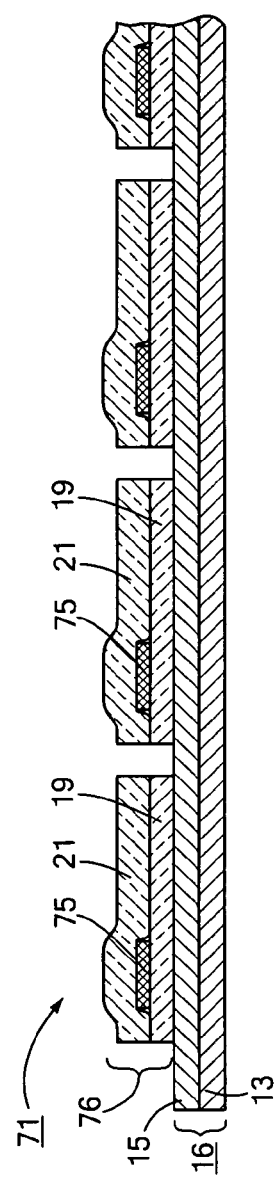
FIGS. 8(a) and 8(b) are fragmentary section and fragmentary partially exploded views, respectively, of a conventional label assembly of the type comprising a plurality of RFID labels spaced apart from one another and releasably mounted on a common web of material.
Figure 8B:
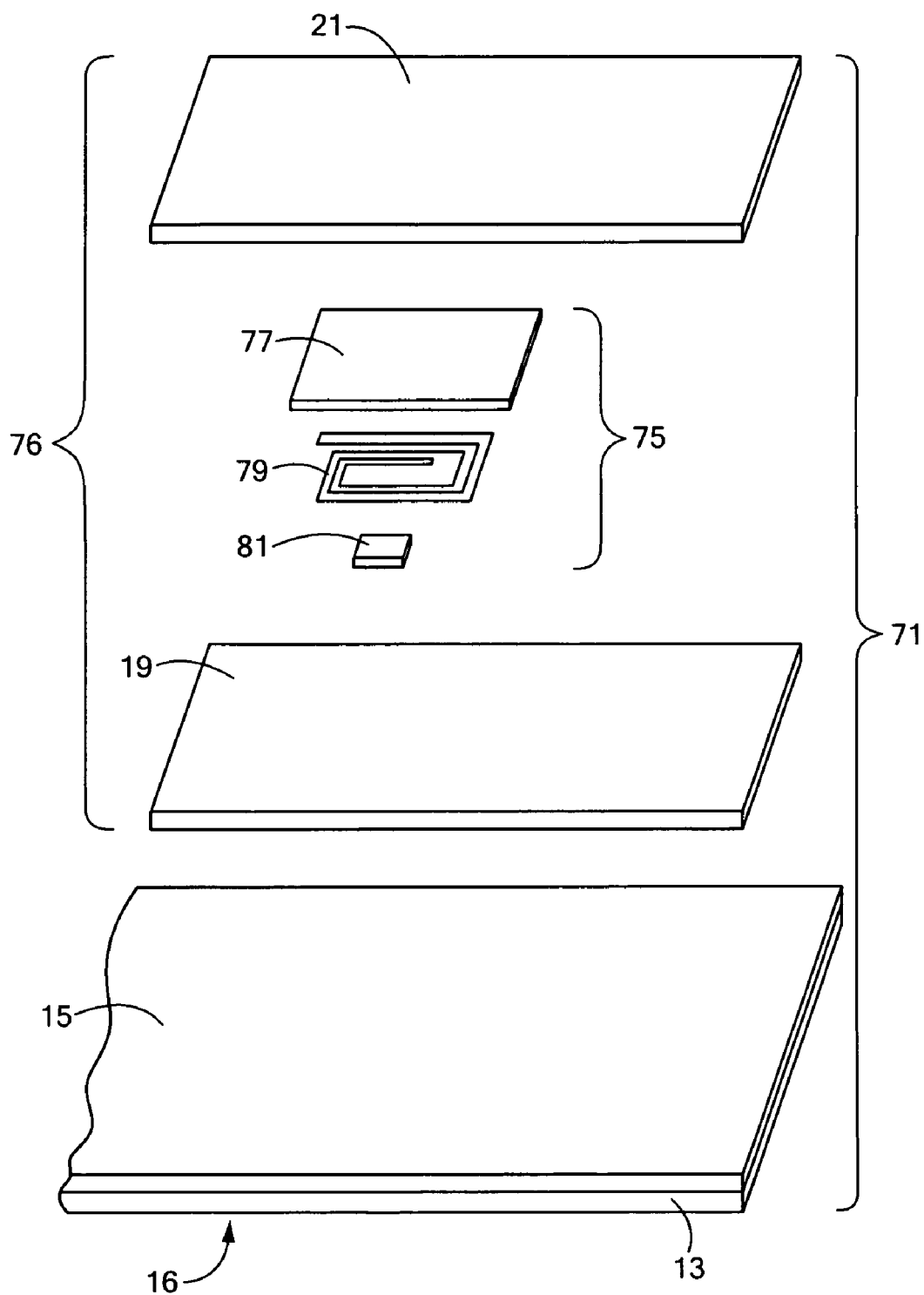

As noted above, one problem with conventional label assemblies of the type comprising a plurality of RFID labels spaced apart and releasably mounted on a common web is that a substantial number (i.e., as great as 1-20%) of such RFID labels have defective inlays. Consequently, an industrial user of such a label assembly, when printing onto such labels, must spend a considerable amount of time testing labels, a sizeable number of which are defective, and then must mark the defective labels as such so that they will not thereafter be applied to articles. Similarly, an industrial user of such a label assembly, when dispensing the labels from a web, must spend time testing labels, a sizeable number of which are defective, and then must dispense the defective labels onto a dummy article or keep the defective labels on the web and then re-wind the web with the defective labels (the re-winding of the web with defective labels often proving difficult due to the bulk of the labels).

The present invention substantially ameliorates the above-described problem by having the label manufacturer test the RFID labels of the label assembly and then remove from the web those RFID labels found to be defective. The label assembly, minus any labels found to be defective, is then provided to the industrial user of the label assembly. An example of such a label assembly is shown in FIGS. 9(a) and 9(b) and is represented generally by reference numeral 85. As can be seen, defective labels have been removed from assembly 85, leaving gaps 87-1 and 87-2 left by one and three labels, respectively, between operable labels 76.

As can readily be appreciated, by having the label manufacturer remove from the assembly those labels found to be defective, one obviates the need for the industrial user of the labels, when printing, to mark the defective labels as such or, when dispensing, to dispense the defective labels onto a dummy article or to re-wind the web, after dispensing, with defective labels.

However, as noted above, most label printing and/or dispensing devices automatically shut down if a label is not detected by a sensor as being present within one or two label positions from the last sensed label. Consequently, if the sensor in a label printing and/or dispensing device is an optical transmission sensor and if one or more label positions are unoccupied due to the removal of defective labels, many printing and/or dispensing devices will mistakenly determine that the printer and/or applicator is out of labels at each unoccupied label position and will automatically shut down, requiring operator intervention, e.g., advancing the web to the next label present thereon.

Figure 10A:
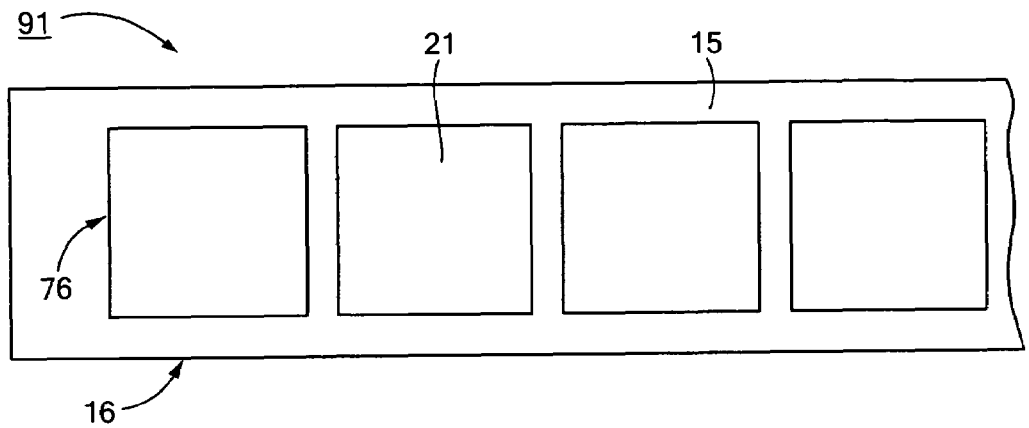
FIGS. 10(a) through 10(c) are fragmentary top, fragmentary side and fragmentary bottom views, respectively, of a second embodiment of a label assembly constructed according to the teachings of the present invention (broken lines being used in FIG. 10(c) to denote the positioning of labels on the top surface of the release coating)
Figure 10B:
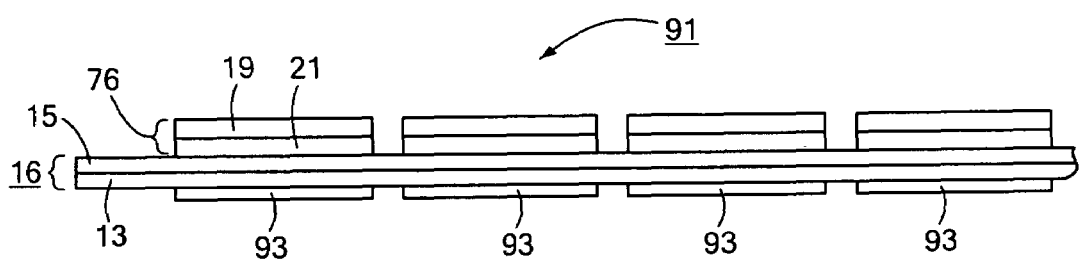
Figure 10C:
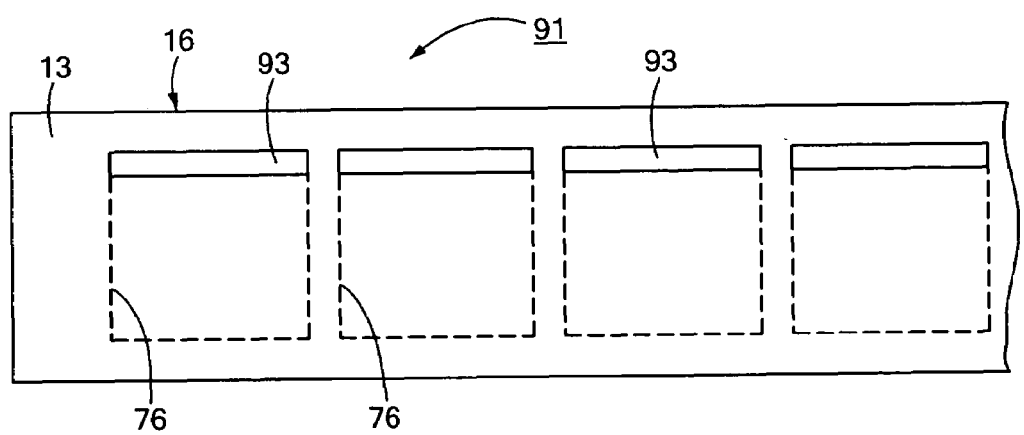
Figure 11A:
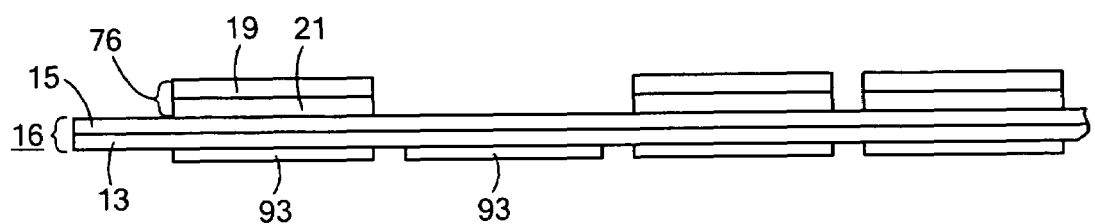
FIGS. 11(a) and 11(b) are fragmentary side and fragmentary bottom views, respectively, of the label assembly of FIGS. 10(a) through 10(c), with a defective label having been removed therefrom (broken lines being used in FIG. 11(b) to denote the positioning of labels on the top surface of the release coating)
Figure 11B:
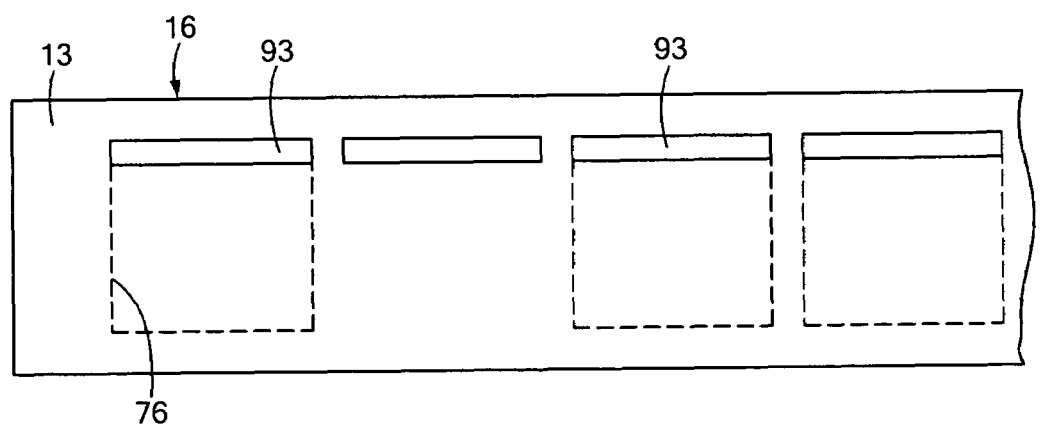

Referring now to FIGS. 10(a) through 10(c), there are shown top, side and bottom views, respectively, of an RFID label assembly that addresses the foregoing problem, said RFID label assembly being represented generally by reference numeral 91. As can be seen, label assembly 91 differs from label assembly 71 in that dark or opaque eye marks 93 are printed on the bottom of backing 13, each of said eye marks 93 being in registration with a corresponding label 76 on the top of web 16 for the entire length of said label 76. (For purposes of the present discussion, the length of label 76 is defined as being along the longitudinal axis of web 16 and does not depend upon whether the label, itself, measures greater along the longitudinal axis of web 16 or across web 16.) As can be appreciated, due to the presence of mark 93 in registration with each label 76, even when a defective label has been removed from web 16 (as is the case in FIGS. 11(a) and 11(b)), an optical transmission sensor will read assembly 91 as though the missing label 76 were still present. In this manner, the unwanted shutting down of the label printing and/or dispensing device at each missing label may be avoided.

Another benefit of mark 93 is that one may avoid errors of the type caused by the optical transmission sensor mistakenly determining that an inlay 75 within a label 76 is the leading edge of the label 76. Such errors occur because label 76 is typically more opaque in areas containing inlay 75 than in areas not containing inlay 75; consequently, optical transmission sensors used to sense the leading edge of a label 76 occasionally determine, in error, that the leading edge of a label 76 has been sensed when, in fact, all that has been sensed is the presence of an inlay 75 within a label 76. Mark 93 is sufficiently opaque to avoid such errors.

As can readily be appreciated, although assembly 91 is designed for use with devices having optical transmission sensors, assembly 91 may alternatively be used with devices having optical reflection sensors.

It should be understood that, although each mark 93 is shown in the present embodiment as having a width less than the width of its corresponding label 76, the width of each mark 93 could be increased to match the width of its corresponding label 76 in order to take into account different optical transmission sensor locations across the width of web 16.

It should also be understood that it may be possible for marks 93 to extend less than the entire length of their corresponding labels 76 so long as marks 93 are sufficiently long to be read by the printing and/or dispensing device as though any labels that are, in fact, missing are nevertheless regarded as still being present.

It should further be understood that one or more of labels 76 may be replaced with non-RFID labels 17.

As can be appreciated, although the use of assembly 91 in printing and/or dispensing devices that rely on an optical transmission sensor prevents such devices from shutting down where a defective label has previously been removed from the assembly, the use of assembly 91 does not prevent such devices from performing tests on inlay operability. In many such devices, such tests are performed a number of times before the device determines that the inlay has failed. Obviously, where the label has previously been removed, there is no inlay, and the performance of such testing is unnecessary and results in a slowing down of the throughput of the device.

Figure 12A:
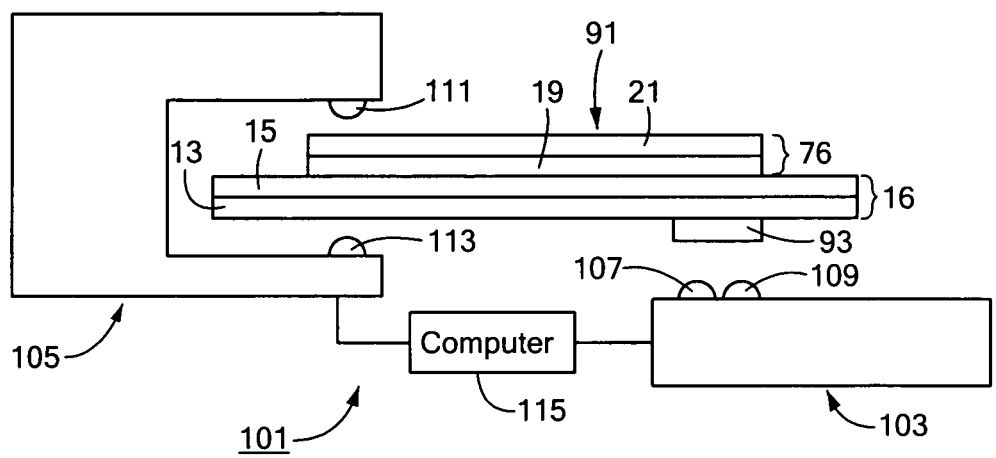
FIGS. 12(a) and 12(b) are schematic end and fragmentary bottom views, respectively, of one embodiment of a system for detecting the occurrence of a removed label from a label assembly, said system being shown in use with the label assembly of FIGS. 11(a) and 11(b)
Figure 12B:
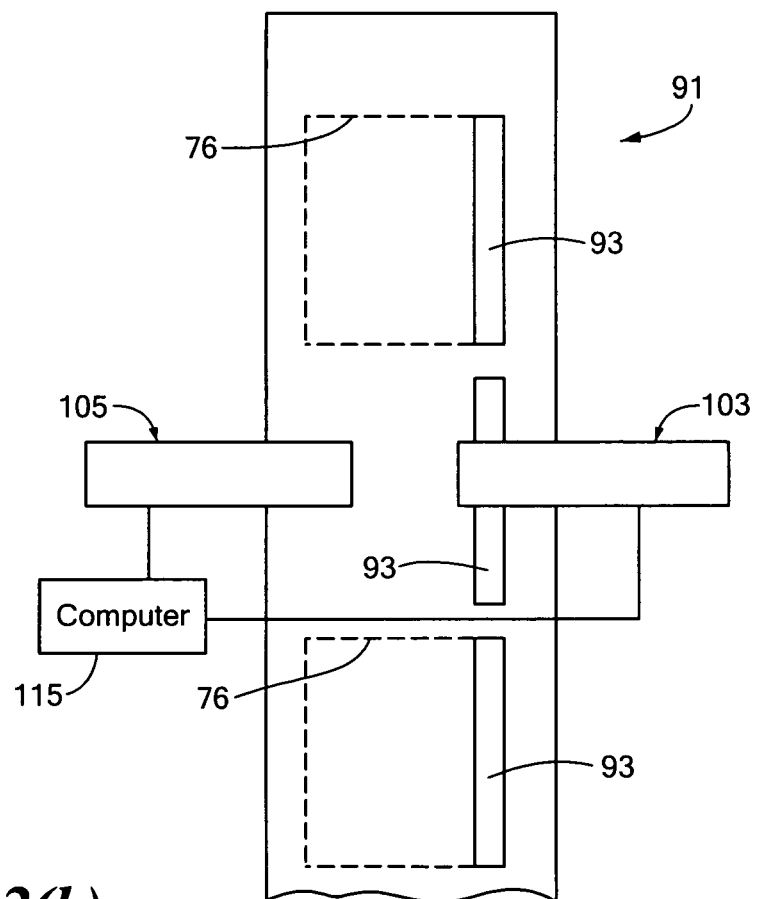

Referring now to FIGS. 12(a) and 12(b), there are shown schematic end and bottom views, respectively, of one embodiment of a system that may be used to detect the occurrence of a removed label from a label assembly of the type exemplified by label assembly 91, said system being represented generally by reference numeral 101.

System 101 includes an optical reflection sensor 103 and an optical transmission sensor 105. Optical reflection sensor 103, which includes a light source 107 and a light detector 109, is arranged relative to assembly 91 to detect, by optical reflection, the presence of a mark 93. Optical transmission sensor 105, which includes a light source 111 and a light detector 113, is arranged relative to assembly 91 to detect, by optical transmission, the presence of a label 76 in an area not covered by mark 93. The outputs of detectors 109 and 113 are coupled to a computer 115. Computer 115 is programmed with software so that, based on the outputs of detectors 109 and 113, a determination can be made as to whether (i) the device is out of labels, in which case the device shuts down, (ii) a defective label has previously been removed from the web, in which case the web is advanced to the next potential label position, or (iii) a label is present, in which case the label inlay is tested for a defect before or during printing.

Figure 13:
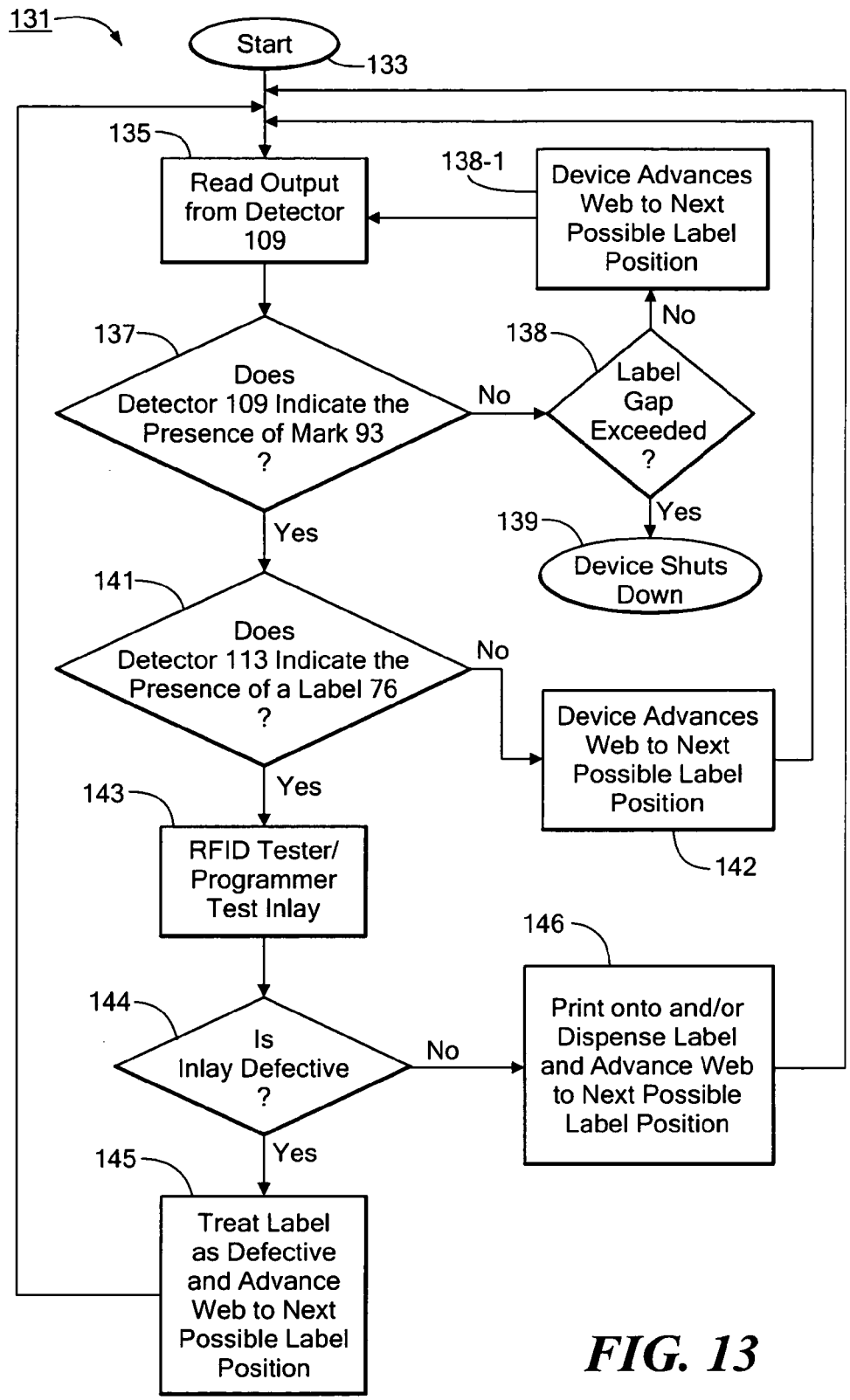
FIG. 13 is a flowchart, illustrating the operation of software employed by the computer in FIGS. 12(a) and 12(b)

Referring now to FIG. 13, there is shown a flowchart depicting the method embodied in the aforementioned software, the flowchart being represented generally by reference numeral 131. As seen in flowchart 131, once the device is turned on, as represented by start step 133, a reading is taken after a predetermined time interval by detector 109, said reading being represented by step 135. The output of detector 109 is then analyzed in the fashion indicated by step 137. More specifically, if the analysis of the output of detector 109 indicates the absence of a mark 93, the device then determines whether a predetermined label gap has been exceeded, as indicated by step 138. If the label gap has been exceeded, the device is instructed to shut down due to an out-of-label condition, as represented by step 139. If the label gap has not been exceeded, the web is advanced, as indicated by step 138-1, and step 135 is repeated. If the analysis of the output of detector 109 indicates the presence of a mark 93, the output of detector 113 is then analyzed in the fashion indicated by step 141. More specifically, if the output of detector 113 indicates the absence of a label 76, the device is instructed to advance the web to the next possible label position, as represented by step 142. On the other hand, if the output of detector 113 indicates the presence of a label 76, computer 115 instructs an RFID tester/programmer to test the label 76, as represented by step 143. The outcome of such testing is then analyzed in the manner indicated by step 144. More specifically, as represented by step 145, if the inlay is found to be defective, a marking may be made on the label (in the case of a printer), the label may be dispensed onto a dummy article (in the case of an applicator) or the label may be left on the web and not dispensed at all (in the case of an applicator). In any of the above outcomes, the web is advanced to the next possible label position. If, as represented by step 146, the inlay is found not to be defective, the label may be printed onto (in the case of a printer) or the label may be dispensed onto an article (in the case of an applicator). In either of the above outcomes, the web is advanced to the next possible label position.

Referring now to FIGS. 14(a) and 14(b), there are shown fragmentary side and fragmentary bottom views, respectively, of a third embodiment of a label assembly constructed according to the teachings of the present invention, said label assembly being represented generally by reference numeral 147.

Assembly 147 is similar in most respects to assembly 91, the principal difference between the two assemblies being that, in assembly 147, eye marks 93 are replaced with L-shaped eye marks 148. Each of eye marks 148 is printed on the bottom of backing 13 and includes a first portion 149 and a second portion 150. Each first portion 149 is in registration with a corresponding label 76 on the top of web 16 for the entire length of said label 76. (For purposes of the present discussion, the length of label 76 is defined as being along the longitudinal axis of web 16 and does not depend upon whether the label, itself, measures greater along the longitudinal axis of web 16 or across web 16.) Each second portion 150 extends perpendicularly relative to its associated first portion 149, i.e., in a direction across the width of web 16, along what corresponds to the leading edge of the label 76.

Eye mark 148, like eye mark 93, is used to indicate the presence of a label 76 on web 16, regardless of whether label 76 is actually present on the top of web 16 or has been removed therefrom. Generally speaking, first portion 149 may be read by an optical transmission sensor or by an optical reflection sensor. However, certain optical reflection sensors may have difficulty in reading first portion 149 because first portion 149 extends significantly more than the typical ⅛ to ¼ inch along the longitudinal axis of web 16. For this reason, second portion 150 is provided, second portion 150 having a length of only about ⅛ to ¼ inch along the length of web 16 and, therefore, being particularly well-suited to be read by optical reflection sensors.

As explained above, an independent problem frequently encountered with RFID label assemblies is that the RFID inlays of such assemblies are frequently spaced so closely to one another on a common web that a reader antenna elicits readings from not only the inlay of interest but also one or more of its neighboring inlays. As noted above, one solution to this problem would be to space the RFID labels sufficiently apart on the web so that only the inlay of interest will produce a signal. However, as can be seen from the discussion above, if the RFID labels are spaced too far apart on the web, many printing and/or dispensing devices will mistakenly determine that they are out of labels and will automatically shut down.

One solution to this problem is embodied in the RFID label assembly of FIGS. 15(a) and 15(b), said RFID label assembly being represented generally by reference numeral 151.

Label assembly 151 comprises a backing 153 and a release coating 155, backing 153 and release coating 155 being identical to backing 13 and release coating 15, respectively, of assembly 11. Label assembly 151 also comprises a plurality of RFID labels 157, labels 157 being releasably mounted on release coating 155. Labels 157, which are identical in construction to labels 76, are spaced apart from one another by a distance $d_1$, wherein $d_1$ is large enough to avoid collisions between neighboring inlays but too large to prevent the printing and/or dispensing device from shutting down after incorrectly determining that it is out of labels.

Label assembly 151 further comprises a plurality of eye marks 161 printed on the bottom of backing 153, each eye mark 161 having a leading edge 163 and a trailing edge 165. The leading edge 163 of each eye mark 161 is aligned with the leading edge 157-1 of a corresponding label 157, and the trailing edge 165 of each eye mark 161 extends beyond the trailing edge 157-2 of the same label 157. The distance trailing edge 165 of mark 161 extends beyond trailing edge 157-2 of label 157 is selected so that the resulting distance $d_2$ separating trailing edge 165 from the leading edge 157-1 of the next label 157 is less than the maximum spacing recognized by the label printing and/or dispensing device as an out-of-labels condition. For example, $d_2$ may be approximately ⅛ to ¼ inch. Consequently, despite the fact that labels 157 are spaced apart by a distance exceeding the maximum distance permitted by the label printing and/or dispensing device, marks 161 will prevent the device from shutting down due to an incorrect determination that it is out of labels.

As can be appreciated, assembly 151 may be used in label printing and/or dispensing devices using either an optical transmission sensor or an optical reflection sensor. If necessary, marks 161 may be modified along the lines of mark 148 to include a laterally-extending portion particularly well-suited for use with optical reflection sensors.

Figure 16A:
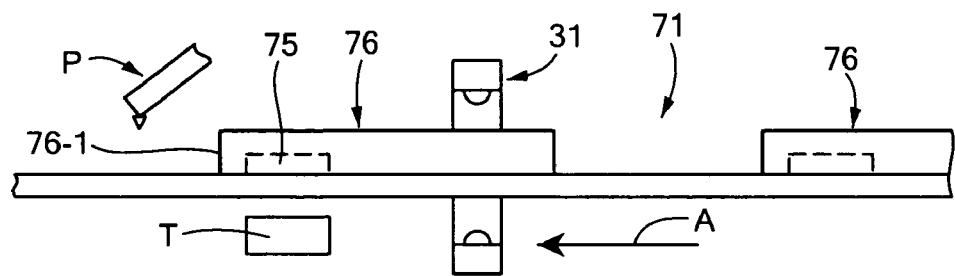
FIGS. 16(a) through 16(d) are schematic side views, illustrating the common problem of RFID labels having to be shuttled back and forth between an optical transmission sensor and an inlay reader of a typical label printing and/or dispensing device (broken lines being used in FIGS. 16(a) and 16(b) to depict the inlays present within the RFID labels)
Figure 16B:
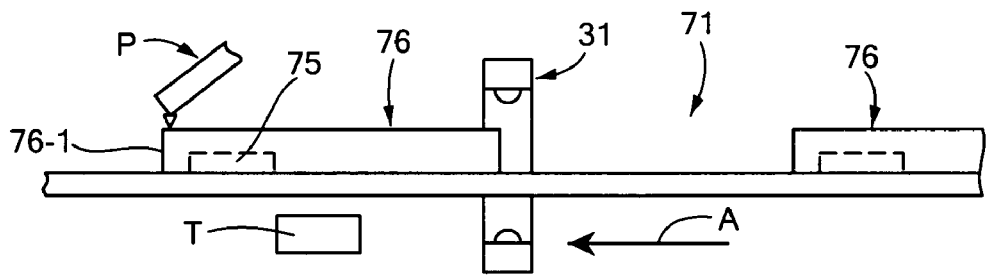
Figure 16C:
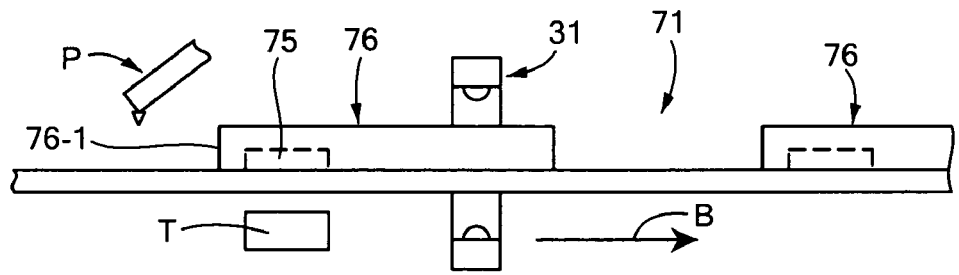
Figure 16D:
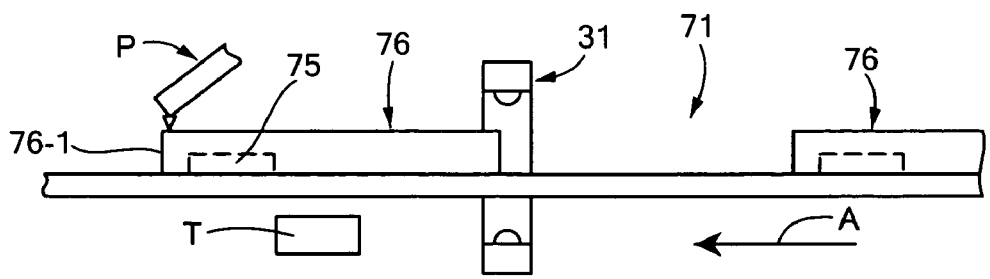

Still another problem commonly associated with the printing and/or dispensing of RFID labels is that, due to the relative positions of the RFID tester/programmer and the optical sensor of many label printing and/or dispensing devices, labels must be shuttled back and forth between the optical sensor and the RFID tester/programmer in order for the label inlays to be tested. An illustration of the aforementioned problem is schematically depicted in FIGS. 16(a) through 16(d). As seen in FIG. 16(a), when assembly 71 is initially advanced in the direction of arrow A so that inlay 75 is positioned over RFID tester/programmer T, the leading edge 76-1 of label 76 has not yet arrived at print head P. Later, as shown in FIG. 16(b), when assembly 71 is advanced in the direction of arrow A so that leading edge 76-1 of label 76 is at print head P, inlay 75 is no longer positioned over tester/programmer T. As a result, as seen in FIG. 16(c), assembly 71 must be retracted in the direction of arrow B to position inlay 75 once again over tester/programmer T. Then, as seen in FIG. 16(d), after the testing of inlay 75 by tester/programmer T is complete, assembly 71 is advanced in the direction of arrow A so that information may be printed onto label 76 by print head P.

Figure 17A:
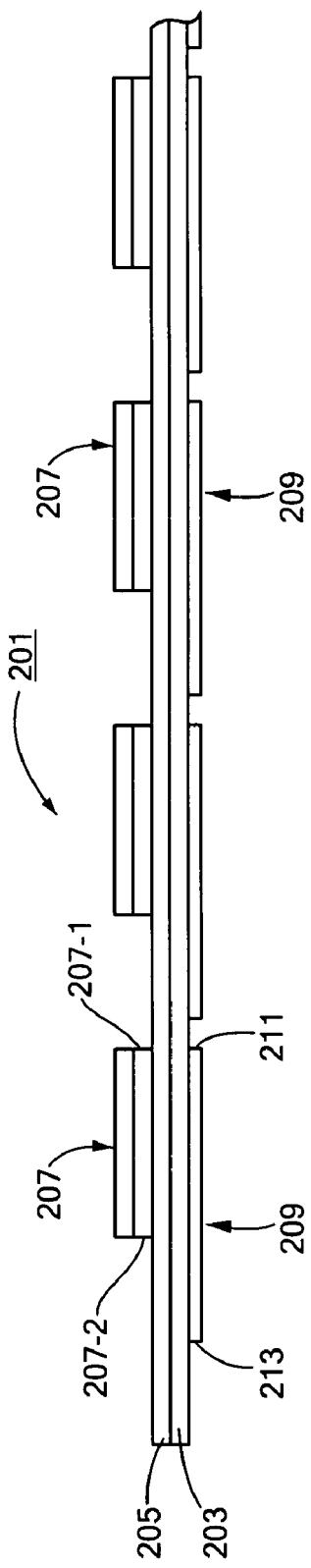
FIGS. 17(a) and 17(b) are fragmentary side and fragmentary bottom views, respectively, of a fifth embodiment of a label assembly constructed according to the teachings of the present invention (broken lines being used in FIG. 17(b) to denote the positioning of labels and their respective inlays on the top surface of the release coating)
Figure 17B:
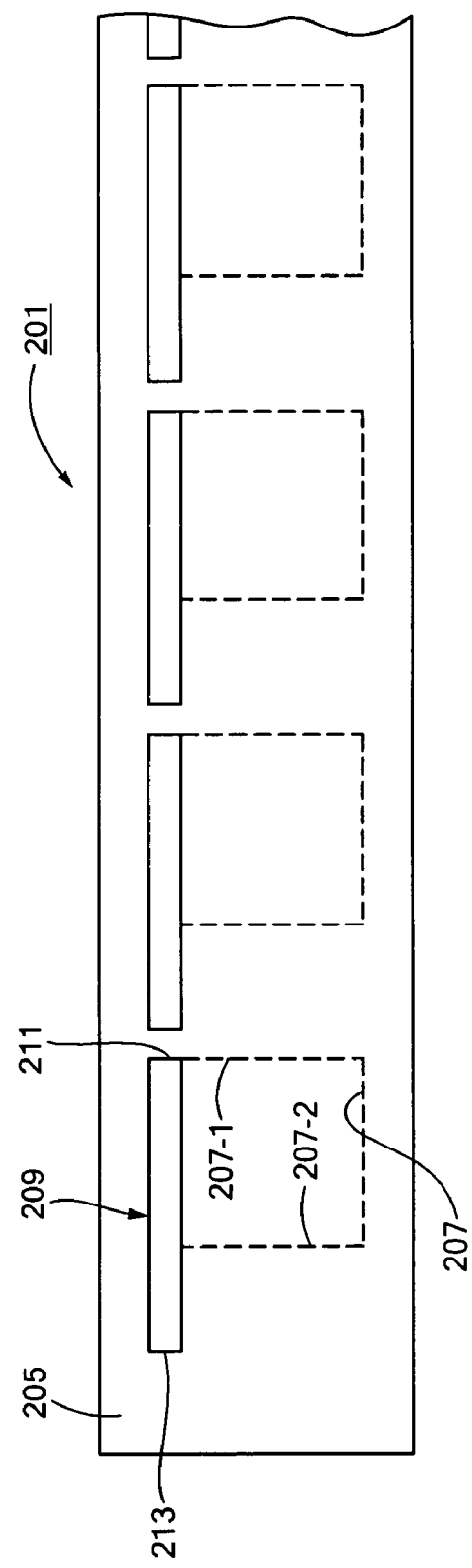

One solution to this problem is embodied in the RFID label assembly of FIGS. 17(a) and 17(b), said RFID label assembly being represented generally by reference numeral 201.

Label assembly 201 comprises a backing 203 and a release coating 205, backing 203 and release coating 205 being identical to backing 13 and release coating 15, respectively, of assembly 11. Label assembly 201 also comprises a plurality of RFID labels 207. Labels 207, which are identical to labels 76, are releasably mounted on release coating 205.

Figure 18:
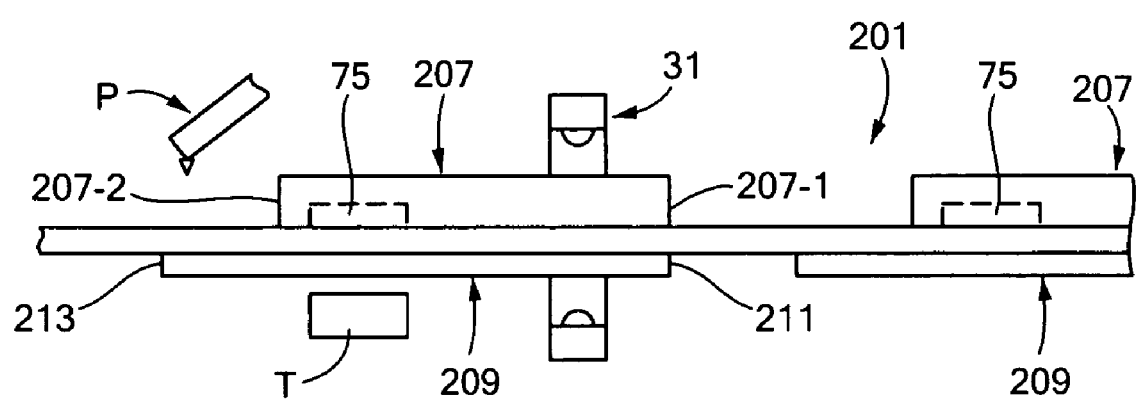
FIG. 18 is a schematic side view, illustrating how the label assembly of FIGS. 17(a) and 17(b) avoids the shuttling problem shown in FIGS. 16(a) through 16(d).

Label assembly 201 further comprises a plurality of eye marks 209 printed on the bottom of backing 203, each eye mark 209 having a trailing edge 211 and a leading edge 213. The trailing edge 211 of each eye mark 209 is aligned with the trailing edge 207-1 of a corresponding label 207, and the leading edge 213 of each eye mark 209 extends beyond the leading edge 207-2 of the same label 207. As seen in FIG. 18, the distance that leading edge 213 of mark 209 extends beyond leading edge 207-2 of label 207 is selected so that, when the leading edge 213 of eye mark 209 is at print head P, inlay 75 is positioned over tester/programmer T.

It should be understood that, although trailing edge 211 of each eye mark 209 extends rearwardly all the way to trailing edge 207-1 of label 207, it may be possible for trailing edge 211 of eye mark 209 to terminate prior to trailing edge 207-1 of label 207, such as at leading edge 207-2 of label 207.

As can be appreciated, assembly 201 is not limited to use with label printing and/or dispensing devices of the type having an optical transmission sensor and may be used with certain label printing and/or dispensing devices of the type having an optical reflection sensor.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of manufacturing an RFID label assembly, said method comprising the steps of:
    (a) providing a precursor RFID label assembly, said precursor RFID label assembly comprising a plurality of RFID labels spaced apart from one another and releasably mounted on top of a common web, said common web having a top surface and a bottom surface, at least some of said RFID labels being defective at least some of said RFID labels not being defective;
    (b) testing all of said RFID labels for the purpose of detecting defective RFID labels; and
    (c) removing from said common web all RFID labels found in step (b) to be defective, while retaining on the common web all RFID labels found in step (b) not to be defective, thereby yielding an RFID assembly that includes all of the RFID labels found not to be defective in step (b) while lacking all of the RFID labels found to be defective in step (b); and
    wherein each of said RFID labels comprises a print-receptive face sheet, said method further comprising, after said step of removing all RFID labels found in step (b) to be defective, the step of printing onto said print-receptive face sheet of at least one of said RFID labels remaining on said common web.

2. The method as claimed in claim 1 wherein said removing step is performed at a first location and wherein said printing step is performed at a second location, said second location being remote from said first location.

3. A method of manufacturing an RFID label assembly, said method comprising the steps of:
    (a) providing a precursor RFID label assembly, said precursor RFID label assembly comprising a plurality of RFID labels spaced apart from one another and releasably mounted on top of a common web, said common web having a top surface and a bottom surface, at least some of said RFID labels being defective and at least some of said RFID labels not being defective, wherein the precursor RFID label assembly further comprises an eye mark printed on the bottom surface of said common web for each of said RFID labels;
    (b) testing all of said RFID labels for the purpose of detecting defective RFID labels;
    (c) removing from said common web all RFID labels found in step (b) to be defective, while retaining on the common web all RFID labels found in step (b) not to be defective, thereby yielding an RFID assembly that includes all of the RFID labels found not to be defective in step (b) while lacking all of the RFID labels found to be defective in step (b); and
    wherein each of said RFID labels has a leading edge and a trailing edge and wherein said eye mark extends at least from a first location aligned with said leading edge of a corresponding label to a second location aligned with said trailing edge of said corresponding label.

4. The method as claimed in claim 3 wherein said eye mark has a leading edge and a trailing edge and wherein each of said RFID labels has a leading edge and a trailing edge, said leading edge of said eye mark being aligned with said leading edge of a corresponding RFID label, said trailing edge of said eye mark being aligned with said trailing edge of said corresponding RFID label.

5. The method as claimed in claim 4 wherein said eye mark is L-shaped.

6. The method as claimed in claim 4 wherein said eye mark is a straight line.

7. The method as claimed in claim 3 wherein said eye mark has a leading edge and a trailing edge and wherein each of said RFID labels has a leading edge and a trailing edge, said leading edge of said eye mark being aligned with said leading edge of a corresponding RFID label, said trailing edge of said eye mark extending beyond said trailing edge of said corresponding RFID label.

8. The method as claimed in claim 3 wherein said trailing edge of said eye mark extends to within ⅛ to ¼ inch of an adjacent eye mark.

9. The method as claimed in claim 3 wherein said eye mark has a leading edge and a trailing edge and wherein each of said RFID labels has a leading edge and a trailing edge, said trailing edge of said eye mark being aligned with said trailing edge of a corresponding RFID label, said leading edge of said eye mark extending beyond said leading edge of said corresponding RFID label.

10. The method as claimed in claim 9 wherein said trailing edge of said eye mark extends to within ⅛ to ¼ inch of an adjacent eye mark.

11. An RFID label assembly made by the method as claimed in claim 1.

12. An RFID label assembly made by the method as claimed in claim 3.

13. An RFID label assembly made by the method as claimed in claim 4.

14. An RFID label assembly made by the method as claimed in claim 7.

15. An RFID label assembly made by the method as claimed in claim 9.

16. A label assembly comprising:
    (a) an elongated web, said elongated web having a top surface and a bottom surface;
    (b) a plurality of RFID labels, said plurality of RFID labels being releasably mounted on said top surface of said elongated web and spaced apart from one another sufficiently to avoid collisions between RFID inlays of different RFID labels, each of said RFID labels having a leading edge and a trailing edge; and
    (c) an eye mark printed on said bottom surface of said elongated web for each of said RFID labels, said eye mark having a leading edge and a trailing edge, with one of said leading edge of said eye mark being aligned with said leading edge of a corresponding RFID label and said trailing edge of said eye mark being aligned with said trailing edge of said corresponding RFID label, the other of said leading edge of said eye mark and said trailing edge of said eye mark extending to within ⅛ to ¼ inch of an adjacent eye mark.

17. A label assembly comprising:
    (a) an elongated web, said elongated web having a top surface and a bottom surface;
    (b) a plurality of RFID labels, said plurality of RFID labels being releasably mounted on said top surface of said elongated web and spaced apart from one another sufficiently to avoid collisions between RFID inlays of different RFID labels, each of said RFID labels having a leading edge and a trailing edge; and (c) an eye mark printed on said bottom surface of said elongated web for each of said RFID labels, said eye mark having a leading edge and a trailing edge, one of said leading edge and said trailing edge of said eye mark being aligned with a portion of a corresponding RFID label, the other of said leading edge and said trailing edge of said eye mark extending to within 1/8 to 1/4 inch of an adjacent RFID label.

18. A method of processing labels, said method comprising the steps of:
   (a) providing an RFID label assembly as claimed in claim 3;
   (b) providing a label printing and/or dispensing device, said label printing and/or dispensing device having an optical transmission sensor for sensing RFID labels; and
   (c) using said label printing and/or dispensing device to print and/or dispense the RFID labels of said RFID label assembly;
   (d) wherein said eye marks of said RFID label assembly are appropriately positioned on said common web so as to be read by said optical transmission sensor as indicating that missing labels are present.

19. A method of processing labels, said method comprising the steps of:
   (a) providing an RFID label assembly, said RFID label assembly being prepared by a method comprising the steps of:
      (i) providing a precursor RFID label assembly, said precursor RFID label assembly comprising a plurality of RFID labels spaced apart from one another and releasably mounted on top of a common web, said common web having a top surface and a bottom surface, at least some of said RFID labels being defective and at least some of said RFID labels not being defective, said precursor RFID label assembly further comprising an eye mark printed on the bottom surface of said common web for each of said RFID labels, wherein each of said RFID labels has a leading edge and a trailing edge, and wherein said eye mark extends at least from a first location aligned with said leading edge of a corresponding label to a second location aligned with said trailing edge of said corresponding label;
      (ii) testing each of said RFID labels for the purpose of detecting defective RFID labels; and
      (iii) removing from said common web all RFID labels found in step (b) to be defective,
   (b) providing a label printing and/or dispensing device, said label printing and/or dispensing device having an optical transmission sensor for sensing RFID labels and an optical reflection sensor for sensing RFID labels, said optical transmission sensor and said optical reflection sensor being used at the same time; and
   (c) using said label printing and/or dispensing device to print and/or dispense the RFID labels of said RFID label assembly;
   (d) wherein said eye marks of said RFID label assembly are appropriately positioned on said common web so as to be read by said optical reflection sensor but not by said optical transmission sensor.

20. A label sensing system for use in a label printing and/or dispensing device, said label sensing system adapted for use with a label assembly prepared by a method comprising the steps of: (i) providing a precursor RFID label assembly, said precursor RFID label assembly comprising a plurality of RFID labels spaced apart from one another and releasably mounted on top of a common web, said common web having a top surface and a bottom surface, at least some of said RFID labels being defective and at least some of said RFID labels not being defective, said precursor RFID label assembly further comprising an eye mark printed on the bottom surface of said common web for each of said RFID labels, wherein each of said RFID labels has a leading edge and a trailing edge, and wherein said eye mark extends at least from a first location aligned with said leading edge of a corresponding label to a second location aligned with said trailing edge of said corresponding label; (ii) testing each of said RFID labels for the purpose of detecting defective RFID labels; and (iii) removing from said common web all RFID labels found in step (b) to be defective, said label sensing system comprising:
   (a) optical reflection sensing means for determining the presence of an eye mark on said label assembly at a potential label position;
   (b) optical transmission sensing means for determining the presence of a label on said label assembly at said potential label position; and
   (c) means, coupled to said optical reflection sensing means and said optical transmission sensing means, for determining whether a label has previously been removed from said label assembly at said potential label position.

* * * * *